US010097716B2

(12) United States Patent
Okayama (10) Patent No.: US 10,097,716 B2
(45) Date of Patent: Oct. 9, 2018

(54) SERVER APPARATUS, INFORMATION PROCESSING SYSTEM, CONTROL METHOD, AND STORAGE MEDIUM

(71) Applicant: CANON KABUSHIKI KAISHA, Tokyo (JP)

(72) Inventor: Noritsugu Okayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/249,047

(22) Filed: Aug. 26, 2016

(65) Prior Publication Data
US 2017/0064118 A1 Mar. 2, 2017

(30) Foreign Application Priority Data
Aug. 31, 2015 (JP) .................. 2015-170587

(51) Int. Cl.
| G06F 17/30 | (2006.01) |
| H04L 29/08 | (2006.01) |
| H04N 1/00 | (2006.01) |
| G06F 3/12 | (2006.01) |
| G06K 15/02 | (2006.01) |
| H04L 12/26 | (2006.01) |
| H04L 29/06 | (2006.01) |

(52) U.S. Cl.
CPC ... *H04N 1/00931* (2013.01); *G06F 17/30371* (2013.01); *H04L 43/16* (2013.01); *H04L 67/1095* (2013.01); *H04L 67/42* (2013.01); *H04N 1/0097* (2013.01); *H04N 1/00204* (2013.01); *H04N 1/00344* (2013.01); *H04N 2201/0017* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS 6,343,299 B1 * 1/2002 Huang .............. G06F 17/30578
707/638
6,374,262 B1 * 4/2002 Kodama .......... G06F 17/30575
707/623

(Continued)

FOREIGN PATENT DOCUMENTS

JP 2011-118771 A 6/2011

*Primary Examiner* — Beniyam Menberu
(74) *Attorney, Agent, or Firm* — Canon U.S.A., Inc. IP Division (57) ABSTRACT

There is provided a server apparatus including a storage unit configured to store setting information used by a client apparatus to operate, a reception unit configured to receive, from a first client apparatus, a deletion request for deleting a part of the setting information from among the setting information stored in the storage unit, a notification unit configured to notify a second client apparatus of update information indicating that the part of the setting information for which the deletion request has been made is deleted, and a control unit configured to perform control in such a manner that the update information remains to be stored in the storage unit until a predetermined condition is satisfied after the deletion request is received, and is deleted from the storage unit in accordance with a satisfaction of the predetermined condition.

10 Claims, 8 Drawing Sheets

(56) References Cited

U.S. PATENT DOCUMENTS

| | | | | |
|---|---|---|---|---|
| 8,340,651 | B1* | 12/2012 | Gailloux | H04L 67/1095 455/415 |
| 2003/0023759 | A1* | 1/2003 | Littleton | G06F 17/30575 709/248 |
| 2004/0068525 | A1* | 4/2004 | Yamazaki | G06F 17/30575 |
| 2004/0240393 | A1* | 12/2004 | Nishida | H04L 29/12047 370/253 |
| 2006/0031427 | A1* | 2/2006 | Jain | H04L 41/028 709/220 |
| 2007/0088764 | A1* | 4/2007 | Yoon | H04L 29/06027 |
| 2007/0283011 | A1* | 12/2007 | Rakowski | H04L 41/0803 709/225 |
| 2007/0283049 | A1 | 12/2007 | Rakowski et al. | |
| 2009/0198772 | A1* | 8/2009 | Kim | H04L 67/1095 709/203 |
| 2009/0292799 | A1* | 11/2009 | Eisener | H04W 4/08 709/223 |
| 2010/0017443 | A1* | 1/2010 | Xie | H04L 67/1095 707/E17.007 |
| 2010/0118334 | A1* | 5/2010 | Iwase | G06F 3/1204 358/1.15 |
| 2011/0010344 | A1* | 1/2011 | Sjogren | G06F 17/30575 707/638 |
| 2011/0246428 | A1* | 10/2011 | Alfano | H04L 41/0856 707/661 |
| 2012/0179653 | A1* | 7/2012 | Araki | G06F 17/30575 707/634 |
| 2013/0018859 | A1* | 1/2013 | Wilkins | G06Q 10/10 707/696 |
| 2013/0132338 | A1* | 5/2013 | Numakami | G06F 17/30575 707/610 |
| 2014/0068018 | A1* | 3/2014 | Roh | H04L 67/10 709/219 |
| 2014/0149794 | A1* | 5/2014 | Shetty | H04L 67/1095 714/20 |
| 2014/0195638 | A1* | 7/2014 | Houston | H04L 67/1095 709/217 |
| 2014/0330779 | A1 | 11/2014 | Koneru et al. | |
| 2015/0058287 | A1* | 2/2015 | Zhang | G06F 17/30575 707/610 |
| 2015/0180973 | A1* | 6/2015 | Yang | H04L 67/1095 709/203 |
| 2015/0188748 | A1* | 7/2015 | Watariuchi | H04L 41/046 709/220 |
| 2015/0189116 | A1* | 7/2015 | Ito | H04N 1/00973 358/1.13 |
| 2015/0201040 | A1* | 7/2015 | Horling | H04L 67/1095 709/203 |
| 2015/0227551 | A1 | 8/2015 | Ogura et al. | |
| 2015/0236990 | A1* | 8/2015 | Shan | H04L 51/046 709/206 |

* cited by examiner

SERVER APPARATUS, INFORMATION PROCESSING SYSTEM, CONTROL METHOD, AND STORAGE MEDIUM

BACKGROUND OF THE INVENTION

Field of the Invention

The present invention relates to a technique for sharing setting information via a network between an information processing apparatus and a server apparatus.

Description of the Related Art

In a conventionally known technique, setting information is shared between all the devices managed by a user so that information on a server can be used by the devices with consistency.

In a system discussed in Japanese Patent Application Laid-Open No. 2011-118771, application data is transmitted and received to share between a server and a client. The application data includes a still image, a moving image, a document file, an email, a calendar. The server discussed in Japanese Patent Application Laid-Open No. 2011-118771 manages history information indicating a type (e.g., adding, updating, or deleting) of a change made on data held in the server. In the system discussed in Japanese Patent Application Laid-Open No. 2011-118771, the history information is used for sharing the application data between the server and the client.

The server discussed in Japanese Patent Application Laid-Open No. 2011-118771 keeps storing history information that has been once recorded re in such a manner as not to be deleted. The server discussed in Japanese Patent Application Laid-Open No. 2011-118771 stops recording the history information once the amount of history information stored in the server exceeds an upper limit.

The server discussed in Japanese Patent Application Laid-Open No. 2011-118771 is not configured to delete the history information that has once been recorded. Thus, when the synchronization processing is repeatedly executed, the amount of the history information stored in the server exceeds the upper limit of the storage capacity of the server.

In the system discussed in Japanese Patent Application Laid-Open No. 2011-118771, the synchronization processing using the history information can no longer be executed once the amount of the history information exceeds the upper limit. Then, the system discussed in Japanese Patent Application Laid-Open No. 2011-118771 switches synchronization processing to that using no history information after the amount of the history information has exceeded the upper limit. As a result, a load for executing the synchronization processing increases in the system compared with that before the amount of the history information has exceeded the upper limit.

In this way, in such a conventional technique, the storage capacity of the server cannot be effectively used because the synchronization processing is repeatedly executed without deleting the history information that is no longer required.

SUMMARY OF THE INVENTION

According to an aspect of the present invention, a server apparatus including at least one processor and at least one memory, the server apparatus includes a storage unit configured to store setting information used by a client apparatus to operate, wherein the at least one processor and the at least one memory act as a reception unit configured to receive, from a first client apparatus, a deletion request for deleting a part of the setting information stored in the storage unit, a notification unit configured to notify a second client apparatus of update information indicating that the part of the setting information to which the deletion request has been transmitted is deleted, and a control unit configured to perform control in such a manner that the update information remains to be stored in the storage unit until a predetermined condition is satisfied after the deletion request is received, and is deleted from the storage unit when the predetermined condition is satisfied.

Further features of the present invention will become apparent from the following description of exemplary embodiments with reference to the attached drawings.

DESCRIPTION OF THE EMBODIMENTS

Exemplary embodiments of the present invention are described below with reference to the drawings. The exemplary embodiments described below are not intended to limit the invention according to the appended claims. Not all the combinations among features described in the exemplary embodiments are not necessarily required for the solution provided by the present invention.

Figure 1:
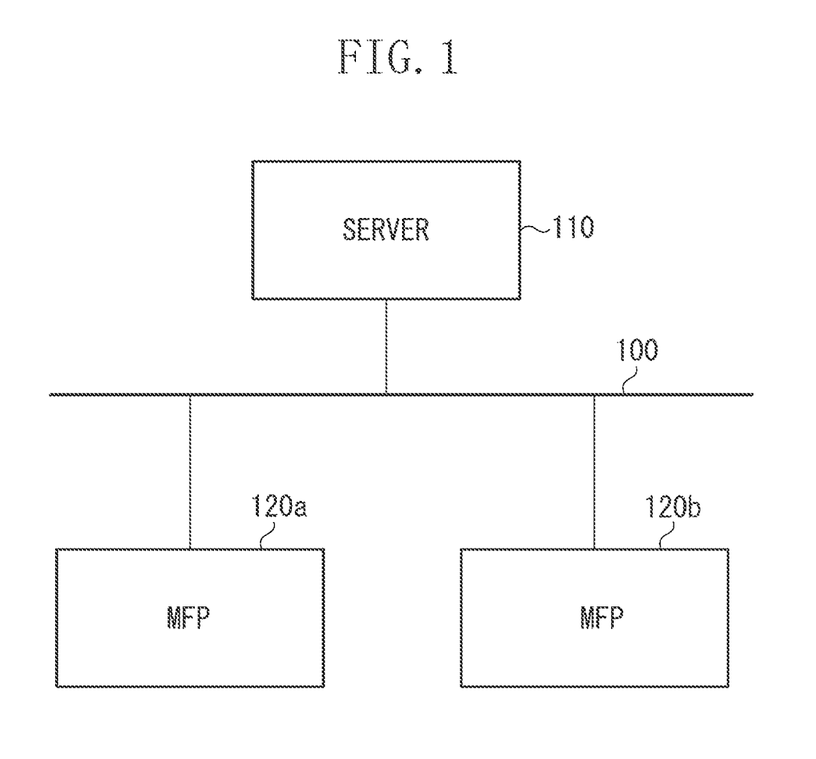
FIG. 1 is a block diagram illustrating an example of a configuration of a synchronizing system.

FIG. 1 is a block diagram illustrating a configuration of an information processing system according to a first exemplary embodiment. A server 110 (server apparatus) and multi-function peripherals (MFPs) 120*a* and 120*b* (client apparatuses) are connected to a network 100. The MFPs 120*a* and 120*b* are collectively referred to as an MFP 120 in some cases. In the description below, when the same setting information is shared between the server 110 and the MFP 120 at the same time, it is referred to as setting information being synchronized between the server 110 and the MFP 120*a* or 121*b*.

The server 110 is an information processing apparatus that manages master data 411 of setting information of the MFPs 120*a* and 120*b*. The setting information is information used by the MFP 120 to operate. Examples of the setting information include address data, setting values of print density and standby time before the apparatus transitions to a sleep mode, and configuration information (Internet protocol (IP) address and information indicating whether the MFP 120 has a FAX unit) of the MFP 120. When the master data 411 held in the server 110 is updated, the server 110 transmits information indicating a content of update (hereinafter, referred to as update information) to the MFPs 120*a* and 120*b* via the network 100. For example, the update information, transmitted from the server 110 to the MFP 120*a*, is information indicating a difference between setting information that has been shared between the server 110 and the MFP 120*a* and setting information after the update in the server 110. The same applies to update information transmitted from the server 110 to the MFP 120*b*.

Upon receiving the update information for the setting information from the MFPs 120*a* and 120*b*, the server 110 updates values in the master data 411. The server 110 may be an image forming apparatus having a management function for the setting information.

The MFP 120 is an apparatus implementing various types of functions such as copy and facsimile, for example. The MFP 120 stores therein setting information used for implementing such functions. The MFP 120 also functions as an image forming apparatus that executes processing of forming an image on a recording medium such as paper. When the setting information is updated, the MFP 120*a* transmits the update information to the server 110 via the network 100. For example, the update information is information indicating a difference between setting information that has been shared between the MFP 120*a* and the server 110 and setting information that has been updated in the MFP 120*a*.

Upon receiving the update information for the master data 411 of the setting information from the server 110, the MFP 120*a* updates the setting information stored therein with the received update information. The MFP 120*b* shares the setting information with the server 110, in a manner similar to that of the MFP 120*a*.

With this configuration, the same setting information can be stored in the server 110 and in the MFPs 120*a* and 120*b*.

For example, when the setting information, in the master data 411 on the server 110, used by both MFPs 120*a* and 120*b* is updated, the server 110 transmits the update information of the setting information to the MFPs 120*a* and 120*b*. In this way, the setting information held by the server 110 and the setting information held by the MFPs are synchronized.

When the setting information in any one of the MFPs 120*a* and 120*b* is updated, the MFP in which the setting information has been updated transmits the update information to the server 110. The server 110 updates the master data 411 with the received update information. When the master data 411 is updated, the server 110 transmits the updated content as the update information, to the MFPs 120*a* and 120*b*. In this way, the same setting information can be constantly stored in the server 110 and in the MFPs 120*a* and 120*b*.

Figure 2:
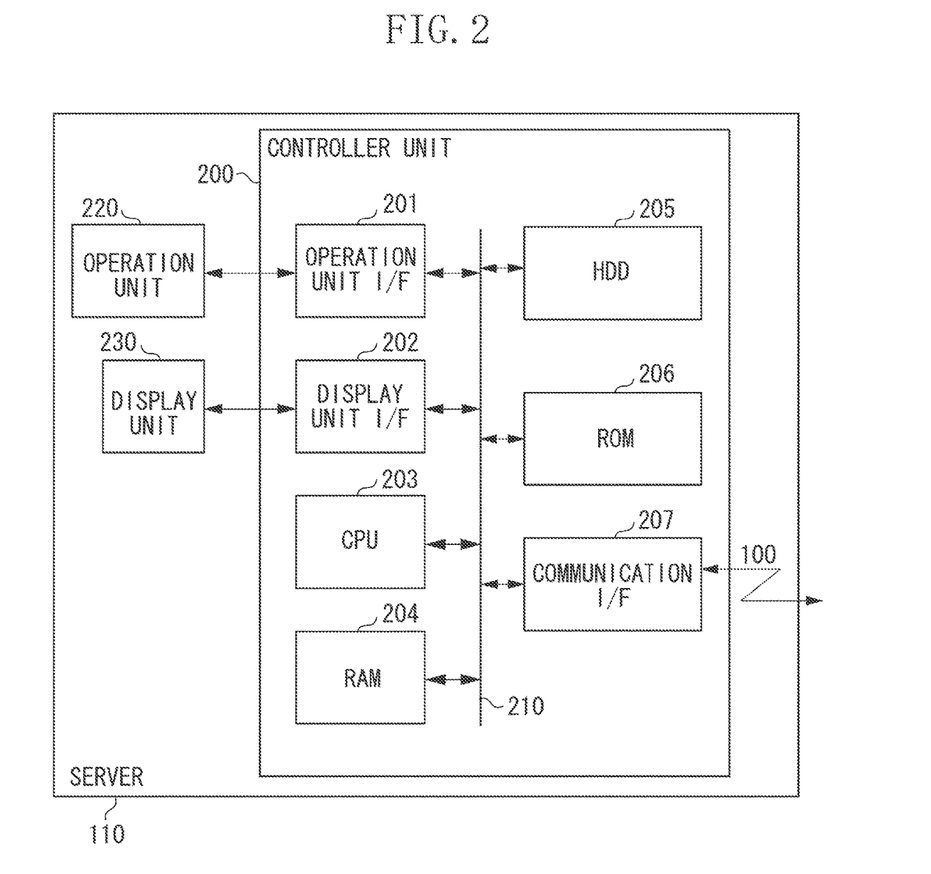
FIG. 2 is a block diagram illustrating a configuration of a server.

Next, a configuration of the server 110 according to the present exemplary embodiment is described with reference to a block diagram in FIG. 2. The server 110 includes a controller unit 200, an operation unit 220, and a display unit 230.

The controller unit 200 includes a central processing unit (CPU) 203. The CPU 203 reads out and executes a boot program stored in a read only memory (ROM) 206 to boot an operating system (OS).

The CPU 203 executes on the OS an application program stored in a hard disk drive (HDD) 205 to execute various types of processing. The CPU 203 uses a random access memory (RAM) 204 as a work area.

The HDD 205 stores the application program, master data 411 of the setting information of the MFP 120, and the like. A method of managing the master data 411 is described in detail below.

The ROM 206, the RAM 204, an operation unit I/F 201, a display unit I/F 202, and a communication I/F 207 are connected to the CPU 203 via a system bus 210.

The operation unit I/F 201 serves as an interface with the operation unit 220. The operation unit 220 may be a mouse, a keyboard, for example. The operation unit I/F 201 notifies the CPU 203 of information input by a user via the operation unit 220.

The display unit I/F 202 outputs image data to the display unit 230. For example, the display unit 230 can display the image data. The communication I/F 207 is connected to the network 100, and inputs and outputs information to and from the devices on the network 100 through the network 100.

Figure 3:
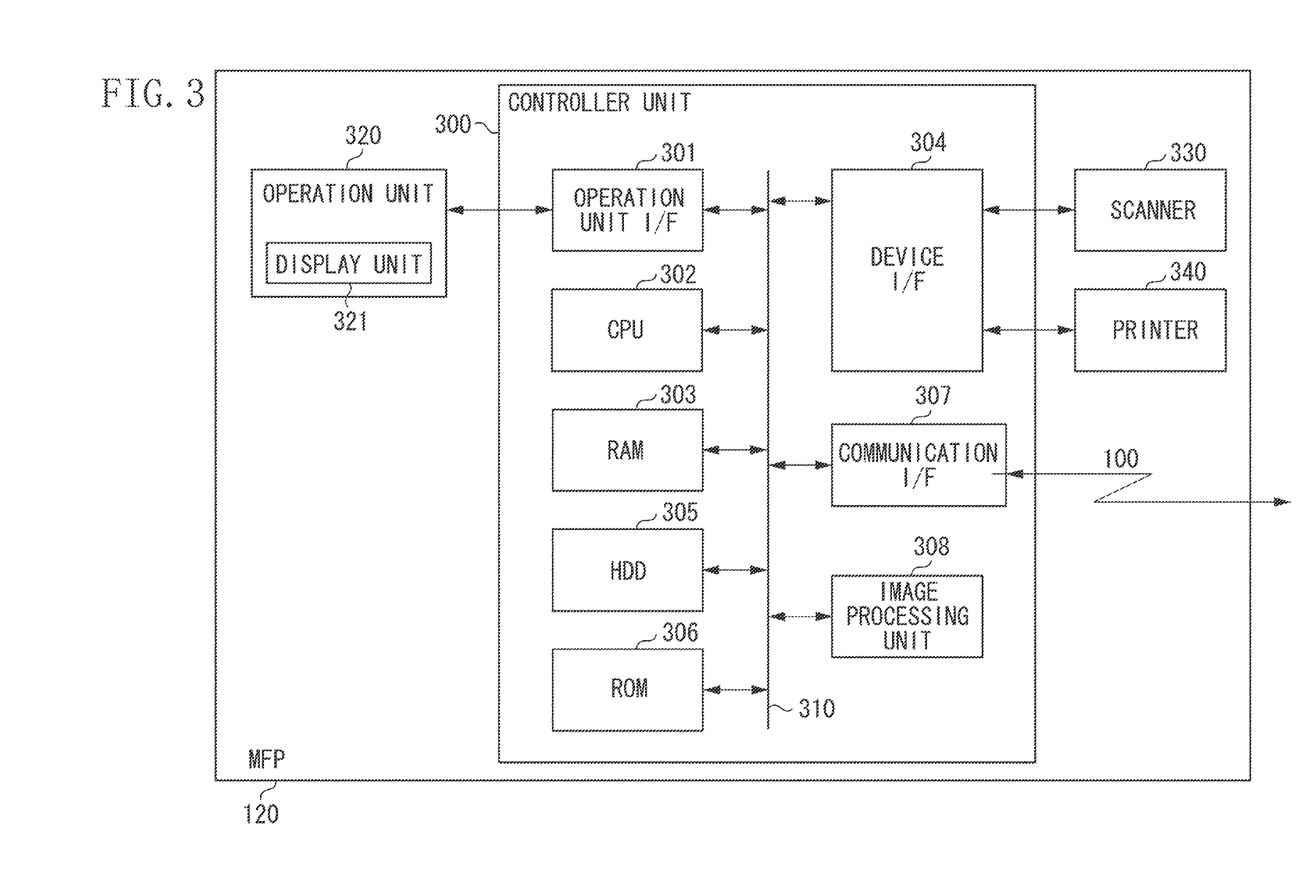
FIG. 3 is a block diagram illustrating a configuration of a multi-function peripheral (MFP).

Next, a configuration of the MFP 120 according to the present exemplary embodiment is described with reference to a block diagram in FIG. 3. The MFP 120 according to the present exemplary embodiment includes a controller unit 300, an operation unit 320, a scanner 330, and a printer 340. The operation unit 320, the scanner 330 serving as an image input device, and the printer 340 serving as an image output device are connected to the controller unit 300.

The controller unit 300 includes a CPU 302. The CPU 302 reads out and executes a boot program stored in a ROM 306 to boot an OS. The CPU 302 executes on the OS an application program stored in an HDD 305 to execute various types of processing. The CPU 302 uses a RAM 303 as a work area. The RAM 303 provides the work area and an image memory area where image data is temporarily stored. The HDD 305 stores the application program, the image data, and various types of setting information. For example, the setting information is used by the CPU 302 to control an operation of the scanner 330 or the printer 340. A method of managing the setting information in the MFP 120 is described below.

The ROM 306, the RAM 303, an operation unit I/F 301, a device I/F 304, a communication I/F 307, and an image processing unit 308 are connected to the CPU 302 via a system bus 310.

The operation unit I/F 301 is an interface with the operation unit 320, to output image data to be displayed on a display unit 321 of the operation unit 320, to the operation unit 320. For example, the operation unit 320 may be a touch panel, for example. The operation unit I/F 301 transmits, to the CPU 302, information input to the operation unit 320 by the user.

The scanner 330 and the printer 340 are connected to the device I/F 304. The scanner 330 reads images to generate image data. The images to be read by the scanner 330 include photographs, pictures, and characters. The printer 340 executes print processing of forming an image on a sheet of paper. The CPU 302 controls the scanner 330 and the printer 340 via the device I/F 304.

The communication I/F 307 is connected to the network 100 and outputs and receives information to and from various devices on the network 100 through the network 100. The image processing unit 308 executes processing such as image input processing from the scanner 330, image output processing to the printer 340, image rotation processing, image compression processing, resolution conversion processing, color space conversion processing, tone conversion processing.

The MFP 120*b* has a same configuration as that of the MFP 120*a* described with reference to FIG. 3.

Figure 4:
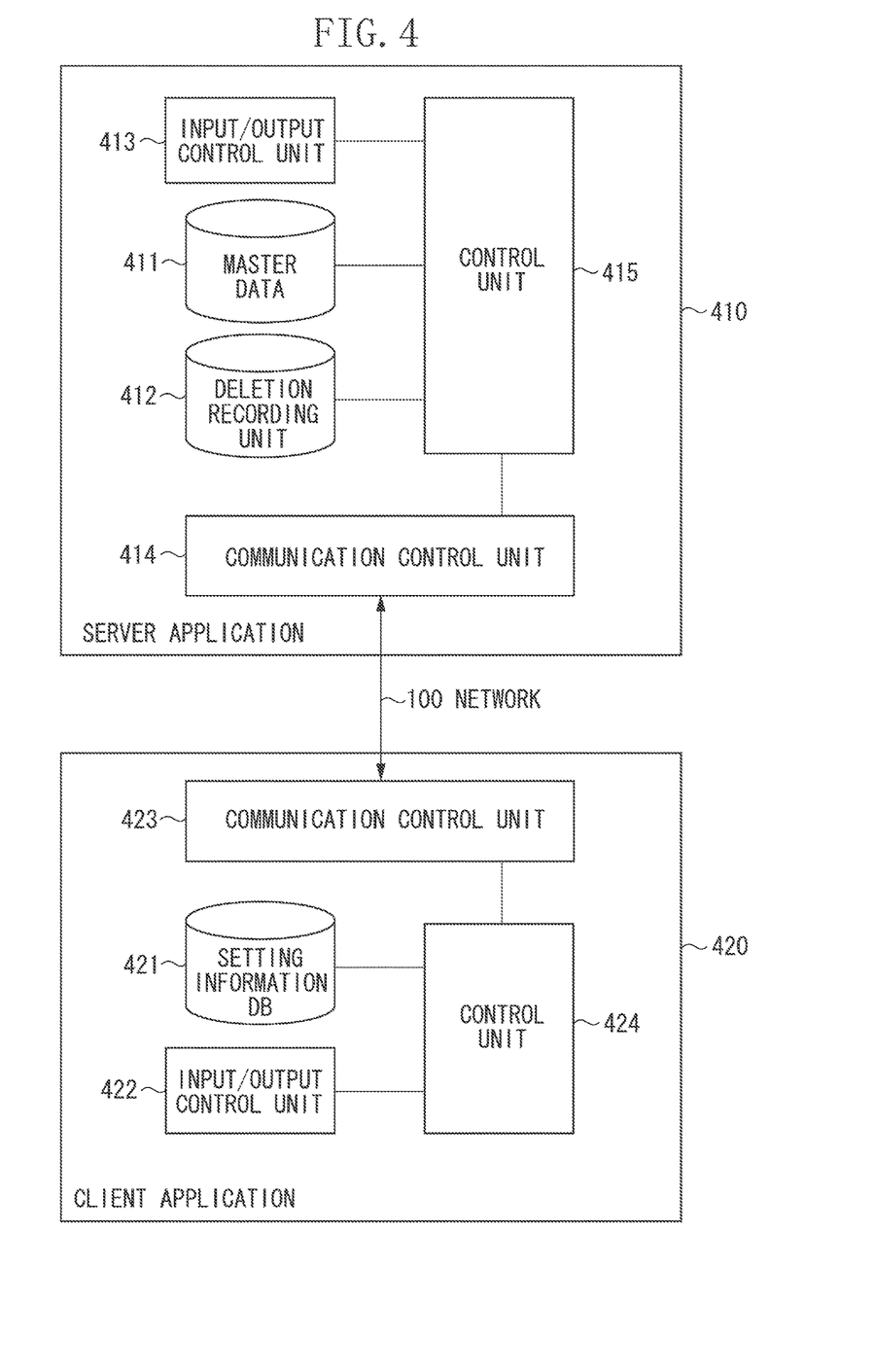
FIG. 4 is a block diagram illustrating a configuration of software modules in the synchronizing system.

Next, an example of a configuration of modules of software executed in a system according to the present exemplary embodiment is described with reference to FIG. 4. A server application 410 is software executed by the CPU 203 of the server 110. A client application 420 is software executed by the CPU 302 of the MFP 120a and the MFP 120b. Each module illustrated in FIG. 4 may be implemented with hardware. First, a configuration of modules of the server application 410 will be described.

The master data 411 is a database that stores the setting information for operating the MFP 120 connected to the server 110.

A deletion recording unit 412 (holding unit) records (holds) information indicating a time at which setting information recorded in the master data 411 is deleted.

An input/output control unit 413 controls the operation unit 220. The input/output control unit 413 notifies a control unit 415 of an instruction input by the user, and controls the display unit 230 to display a screen according to a control performed by the control unit 415.

A communication control unit 414 communicates with the client application 420. The communication control unit 414 executes reception processing of receiving, from the client application 420, an update request for the master data 411. The update request for the master data 411 includes a request for adding, changing, deleting, of the setting information. The addition, the change, and the deletion of the setting information can be performed on each part of the setting information stored in the master data 411.

The communication control unit 414 receives, from the client application 420, an acquisition request for update information representing update contents of the setting information that is stored in the master data 411. In the present exemplary embodiment, the acquisition request includes time information representing a time at which setting information, which is a target of the acquisition request, was shared (synchronized) between the client application 420 and the server application 410. The communication control unit 414 notifies the control unit 415 of the received request.

The communication control unit 414 acquires a response from the control unit 415 to each request, and transmits the response to the client application 420. For example, the communication control unit 414 transmits a response indicating that the master data 411 has been updated to the client application 420, in response to the update request for the master data 411. Further, the communication control unit 414 transmits update information indicating the content of update of the setting information stored in the master data 411, in response to the acquisition request for the update information. The content of update includes information indicating setting information added to the master data 411, in response to an addition request, information indicating that the setting information has been changed, and information indicating that a part of the setting information has been deleted.

The control unit 415 controls each module in the server application 410. The control unit 415 updates the setting information stored in the master data 411 in response to the update request for the master data 411. The control unit 415 that has updated (changing, adding, or deleting) the setting information stored in the master data 411 records information indicating the content of update as well as the updated time in the master data 411. For example, when setting information A that has been stored in the master data 411 is deleted, information indicating that the setting information A has been deleted is recorded in the master data 411 while being associated with the deleted time. The update information indicating that the setting information A has been deleted may be recorded by turning ON a deletion flag associated with the setting information A. When setting information B is changed, updated time of the setting information B is recorded in the master data 411 while being associated with the setting information B that has been changed.

The control unit 415 responds to an acquisition request from the client application 420 with the content of an update of the master data 411 performed after a time indicated by the time information in the acquisition request. The control unit 415 refers to the updated information and the updated time that have been recorded in the master data 411, to determine the content of the response to the acquisition request.

In the present exemplary embodiment, the control unit 415 notifies the client application 420 of only a difference from the setting information previously synchronized between the client application 420 and the server application 410. Therefore, the synchronization processing can be executed through transaction involving only a part of the setting information without transmitting the entire setting information recorded in the master data 411. As a result, the synchronization processing can be executed with a smaller processing load and a smaller communication load.

In the present exemplary embodiment, the user can view and edit the setting information recorded in the master data 411 by operating the operation unit 220 or the operation unit 320 to access the control unit 415 through a web application.

Next, a configuration of modules of the client application 420 will be described.

A setting information database (hereinafter, "DB") 421 serves as a storage unit that stores setting values used by the MFP 120 to operate.

The input/output control unit 422 controls the operation unit 320. The input/output control unit 422 notifies the control unit 424 of an instruction input by the user. Then, the control unit 424 controls the display unit 321 to display a screen according thereto.

A communication control unit 423 communicates with the server application 410. The communication control unit 423 transmits an update request for the master data 411 to the server application 410. As described above, the update request for the master data 411 includes the addition request, the change request, and the deletion request, for the setting information. When the setting information stored in the setting information DB 421 is updated, the communication control unit 423 transmits, to the master data 411, an update request according to the update, under control performed by the control unit 424 described below.

The communication control unit 423 transmits, to the server application 410, an acquisition request for the update information indicating the content of update of the master data 411. For example, the acquisition request for the update information may be periodically transmitted from the client application 420 to the server application 410. The communication control unit 423 receives a response to each request from the server application 410.

The control unit 424 controls each module of the client application 420. The control unit 424 performs control for the setting information stored in the setting information DB 421, including changing, adding, and deleting.

The server application 410 and the client application 420 operate to synchronize the setting information recorded in the master data 411 and the setting information recorded in the setting information DB 421.

Figure 5:
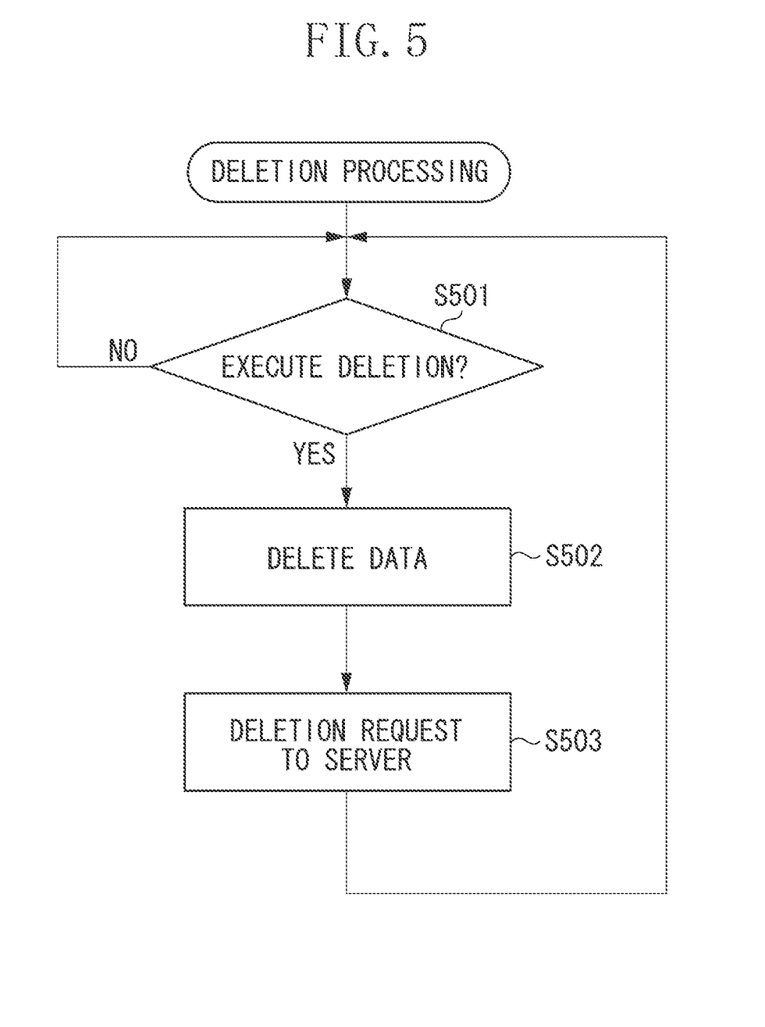
FIG. 5 is a flowchart illustrating deletion processing executed in the MFP.

Next, deletion processing for the setting information will be described. A flow of the deletion processing for the setting information in the MFP 120 is described with reference to FIG. 5. In the present exemplary embodiment, an example is described where the MFP 120*a*, serving as a first client apparatus, executes the processing. The flow illustrated in FIG. 5 is executed by the control unit 424 of the client application 420. For example, the flow illustrated in FIG. 5 is implemented by the CPU 302 reading out and executing a program stored in the HDD 305 or the ROM 306.

In step S501, when a notification indicating that the deletion request is input via the operation unit 320 from the input/output control unit 422 (YES in step S501), the control unit 424 determines to execute the deletion processing, and the processing proceeds to step S502. On the other hand, while no deletion request is input (NO in step S501), the processing in step S501 is repeated.

In step S502, the control unit 424 deletes from the setting information DB 421 setting information of a setting item designated with the deletion request. When the control unit 424 has deleted the setting information, the processing proceeds to step S503.

In step S503, the control unit 424 transmits the deletion request to the server 110. The deletion request includes information indicating the setting item as a target of the deletion request and time information indicating a time at which the setting information was deleted from the setting information DB 421. When the control unit 424 executes the processing in step S503, the processing returns to step S501.

An example of the deletion processing executed by the client application 420 is described with reference to Tables 1 and 2. In the example described with reference to Tables 1 and 2, the deletion processing is executed for the setting information of address data used for sending FAX or an email.

Table 1 illustrates address data before the deletion processing is performed. Table 2 illustrates the address data after the deletion processing of deleting information is performed on an address 3. The client application 420 transmits, to the server application 410, information indicating that the information on the address 3 has been deleted, and information indicating a time at which the deletion was performed.

TABLE 1

| Address No. | Address name | Address |
|---|---|---|
| Address 1 | Okayama | 03-4444-9999 |
| Address 2 | Yamaguchi | aaaa@xxxx.co.jp |
| Address 3 | Hiroshima | bbbb@xxxx.co.jp |
| Address 4 | Fukuoka | cccc@xxxx.co.jp |
| . . . | — | — |
| Address N | — | — |

TABLE 2

| Address No. | Address name | Address |
|---|---|---|
| Address 1 | Okayama | 03-4444-9999 |
| Address 2 | Yamaguchi | aaaa@xxxx.co.jp |
| Address 4 | Fukuoka | cccc@xxxx.co.jp |
| . . . | — | — |
| Address N | — | — |

Figure 6:
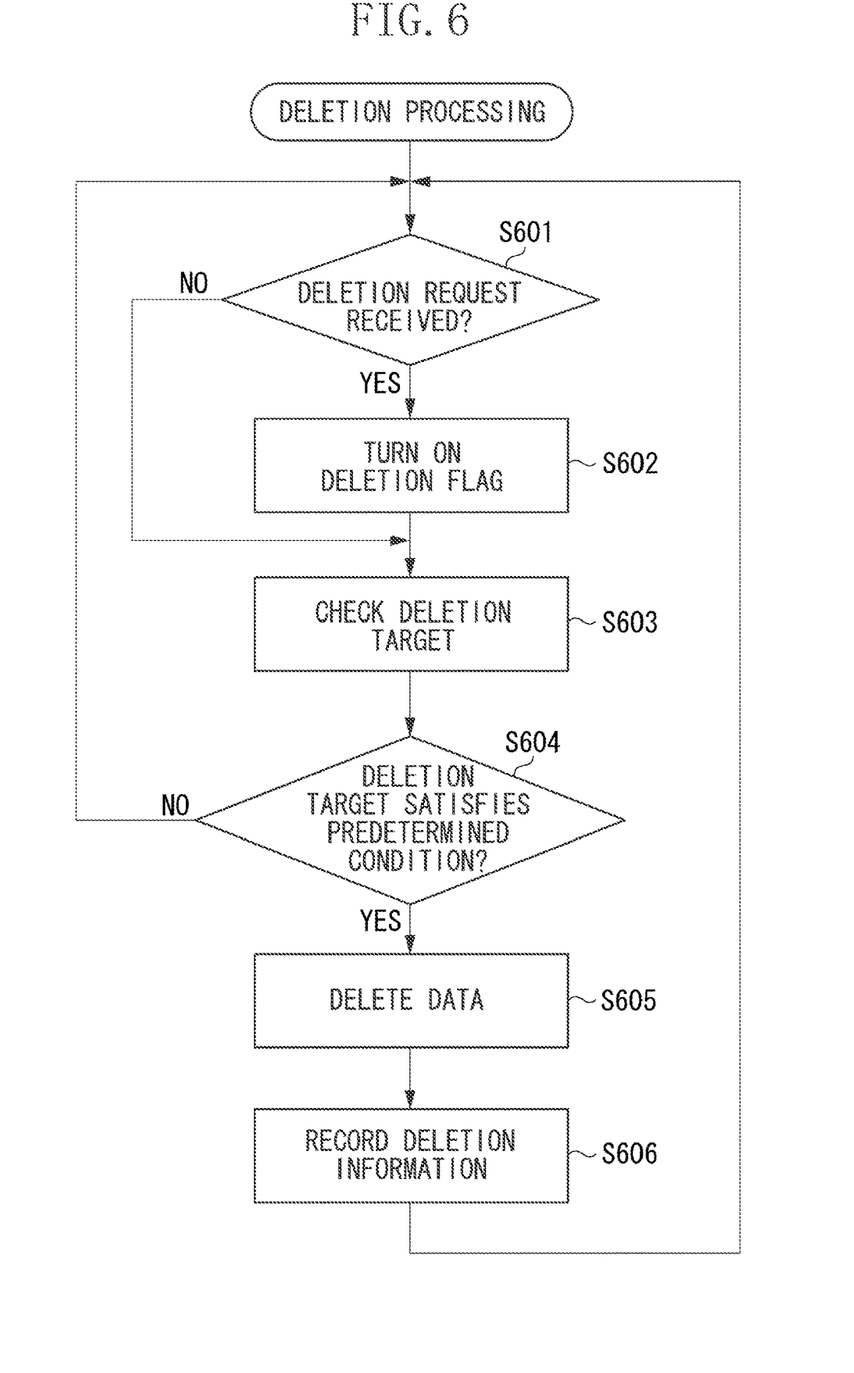
FIG. 6 is a flowchart illustrating deletion processing executed in a server.

Next, deletion processing for setting information executed in the server 110 will be described with reference to FIG. 6. A flow illustrated in FIG. 6 is executed by the control unit 415 of the server application 410. For example, the flow illustrated in FIG. 6 is implemented by the CPU 203 reading out and executing a program stored in the HDD 205 or the ROM 206.

In step S601, the control unit 415 determines whether a deletion request has been received from the client application 420. When the control unit 415 has received the deletion request (YES in step S601), the processing proceeds to step S602. When the control unit 415 has not received the deletion request (NO in step S601), the processing proceeds to step S603.

In step S602, the control unit 415 turns ON a deletion flag corresponding to a setting item of a deletion target, based on identification information included in the deletion request for identifying the setting item of the deletion target. Table 3 illustrates an example of a case where a deletion request for the address 3 is received in a state where the address data illustrated in Table 1 has been synchronized between the server application 410 and the client application 420. In the address 3, a date and time at which the deletion request was received is recorded as a deletion flag. An address number, an address name, and an address associated with the deletion flag are used as an update history of the setting information in the server 110.

In the present exemplary embodiment, the address name and the address information whose deletion flag has been turned ON remain undeleted. Thus, even when the user accidentally deletes the address data, the address name and the address information can be restored on the server 110.

In the present exemplary embodiment, an example is described where the address name and the address information, as for the setting information of the address 3 for which the deletion request has been transmitted from the MFP 120*a*, remain to be stored in the master data 411 as the update history. However, it is not limited thereto. For example, the update history may be recorded in any manner as long as the fact that the setting information about the address 3 has been deleted can be recognized. For example, a message such as "Address 3 20140612 14:11 deletion received" can be employed.

TABLE 3

| Address No. | Address name | Address | Deletion flag |
|---|---|---|---|
| Address 1 | Okayama | 03-4444-9999 | |
| Address 2 | Yamaguchi | aaaa@xxxx.co.jp | |
| Address 3 | Hiroshima | bbbb@xxxx.co.jp | 20140612 14:11 deletion received |
| Address 4 | Fukuoka | cccc@xxxx.co.jp | |
| . . . | | | |
| Address N | — | — | |

In the present exemplary embodiment, as illustrated in Table 3, the control unit 415 does not delete information on the address 3 from the master data 411 at a timing of receiving the deletion request. In this way, in an MFP other than the MFP that has transmitted the deletion request, the synchronization processing of deleting the setting information of the deletion target can be executed with a smaller processing load and a smaller communication load.

For example, when the deletion flag is turned ON for Table 3 in response to the deletion request from the MFP 120*a*, the address data in Table 3 can be synchronized between the server 110 and the MFP 120*b* with the server 110 notifying the MFP 120*b* of the deletion of the address 3.

On the other hand, when the address 3 is deleted from Table 3 in response to the deletion request from the MFP 120*a* without providing the deletion flag so that no update history remains, the server 110 is unable to recognize that the address 3 has been deleted from Table 3. Therefore, for synchronizing the data on Table 3 between the server 110 and the MFP 120b, the address data in the MFP 120b needs to be entirely rewritten with the entire data on Table 3 transmitted from the server 110 to the MFP 120b.

As described above, the deletion processing can be executed with a smaller processing load and a smaller communication load on the system as a whole in the configuration using the update history compared with the configuration not using the update history.

Referring back to FIG. 6, in step S603, the control unit 415 determines whether to delete the setting information (update history) whose deletion flag has been turned ON from the master data 411.

As described above, the synchronization processing can be efficiently executed by using the deletion flag. However, when the setting information whose deletion flag has been turned ON remains to be stored in the master data 411, the setting information that has been deleted in the MFP 120 remains to be stored in the server 110. Accordingly, the update history that is no longer required for the synchronization processing for synchronizing the setting information between the server 110 and the MFP 120 remains to be stored in the master data 411. As a result, a storage capacity of the server 110 is unnecessarily consumed.

Therefore, in step S603, when a predetermined condition is satisfied, the control unit 415 not only turns OFF the deletion flag but also deletes the setting information whose deletion flag has been turned ON. Thus, the storage capacity of the server 110 can effectively be used. More specifically, control is performed in such a manner that the update history remains to be stored in the master data 411 until the predetermined condition is satisfied after the deletion request has been received, and is deleted from the master data 411 when the predetermined condition is satisfied. The update history is update information used by the MFP 120 for identifying a deleted part of the setting information held in the master data 411.

For example, setting information that has been stored for a predetermined time period after its deletion flag has been turned ON in response to the reception of the deletion request by the control unit 415 may be determined as having satisfied the predetermined condition and thus may be determined to be deleted. This means that the update history remains to be stored in the master data 411 until the predetermined time period elapses after the deletion request has been received by the control unit 415. The control unit 415 deletes the update history from the master data 411 when the predetermined time period has elapsed after the deletion request has been received.

Alternatively, the control unit 415 determines to delete the setting information (update history) whose deletion flag has been turned ON from the master data 411, when the setting information of the deletion target has been deleted in all the MFPs connected to the server 110. For example, the server 110 stores identification information of each of the MFPs 120 connected to the server 110 in the master data 411. The server 110 determines whether the synchronization processing has been completed for all the connected MFPs 120 after the time at which the deletion flag was turned ON. The control unit 415 deletes the setting information when a time at which the synchronization processing with the server 110 is completed for all the MFPs 120 connected to the server 110 is after the time at which the deletion flag of the setting information was turned ON. Thus, the update history remains to be stored in the master data 411 until the communication control unit 414 notifies all the MFPs 120 connected to the server 110 of the update history after the control unit 415 has received the deletion request. The control unit 415 performs control in such a way as to delete the update history from the master data 411, when the communication control unit 414 has notified all the client apparatuses of the update history.

Alternatively, the setting information whose deletion flag has been turned ON may be deleted from the server 110 when the number of pieces of the setting information whose deletion flag has been turned ON exceeds a predetermined number, when an amount of data stored in the master data 411 exceeds a predetermined amount, or when a remaining storage capacity of the server 110 for storing the setting information becomes a predetermined amount or below. As described above, the update history remains to be stored in the master data 411 until an amount of setting information stored in the master data 411 after the control unit 415 has received the deletion request exceeds a predetermined threshold. Alternatively, the control unit 415 performs control in such a way as to delete the update history from the master data 411 when the amount of information stored in the master data 411 exceeds a predetermined threshold.

In step S604, the control unit 415 determines whether to delete the setting information (update history) whose deletion flag has been turned ON based on the result in step S603. When the control unit 415 determines not to delete the update history (NO in step S604), the processing returns to step S601. ON the other hand, when the control unit 415 determines to delete the update history (YES step S604), the processing proceeds to step S605. In the present exemplary embodiment, the control unit 415 determines not to delete update information indicating an update (e.g., adding or changing) other than deleting of the setting information. For example, when the communication control unit 414 receives the addition request, update information indicating that setting information has been added is stored in the master data 411. No control is performed for deleting this update information indicating that the setting information has been added, even when the predetermined condition (e.g., elapsing of the predetermined time period) described above is satisfied after the addition request is received.

In step S605, the control unit 415 controls the master data 411 so as to delete the setting information whose deletion flag has been turned ON. In this manner, the update history of the setting information is deleted. Table 4 illustrates an example of setting information in which setting information whose deletion flag has been turned ON is deleted from the master data 411 storing the setting information illustrated in Table 3. When the control unit 415 deletes the update history of the setting information, the processing proceeds to step S606.

TABLE 4

| Address No. | Address name | Address | Deletion flag |
|---|---|---|---|
| Address 1 | Okayama | 03-4444-9999 | |
| Address 2 | Yamaguchi | aaaa@xxxx.co.jp | |
| Address 4 | Fukuoka | cccc@xxxx.co.jp | |
| . . . | — | — | |
| Address N | — | — | |

In step S606, the control unit 415 records information in the deletion recording unit 412. This information indicates that the update history (setting information whose deletion flag has been turned ON) has been deleted from the master data 411. Further, in step S606, the control unit 415 records information indicating a time at which the setting information was deleted, in the deletion recording unit 412.

In the present exemplary embodiment, identification information indicating the setting information that has been deleted is not recorded in the deletion recording unit 412. Even when a plurality of pieces of setting information is deleted in step S605, only one piece of information indicating that the setting information has been deleted from the master data 411 is recorded, and a time at which the final one of the plurality of pieces of setting information was deleted is recorded. When the processing in step S606 is completed, the processing returns to step S601.

Figure 7:
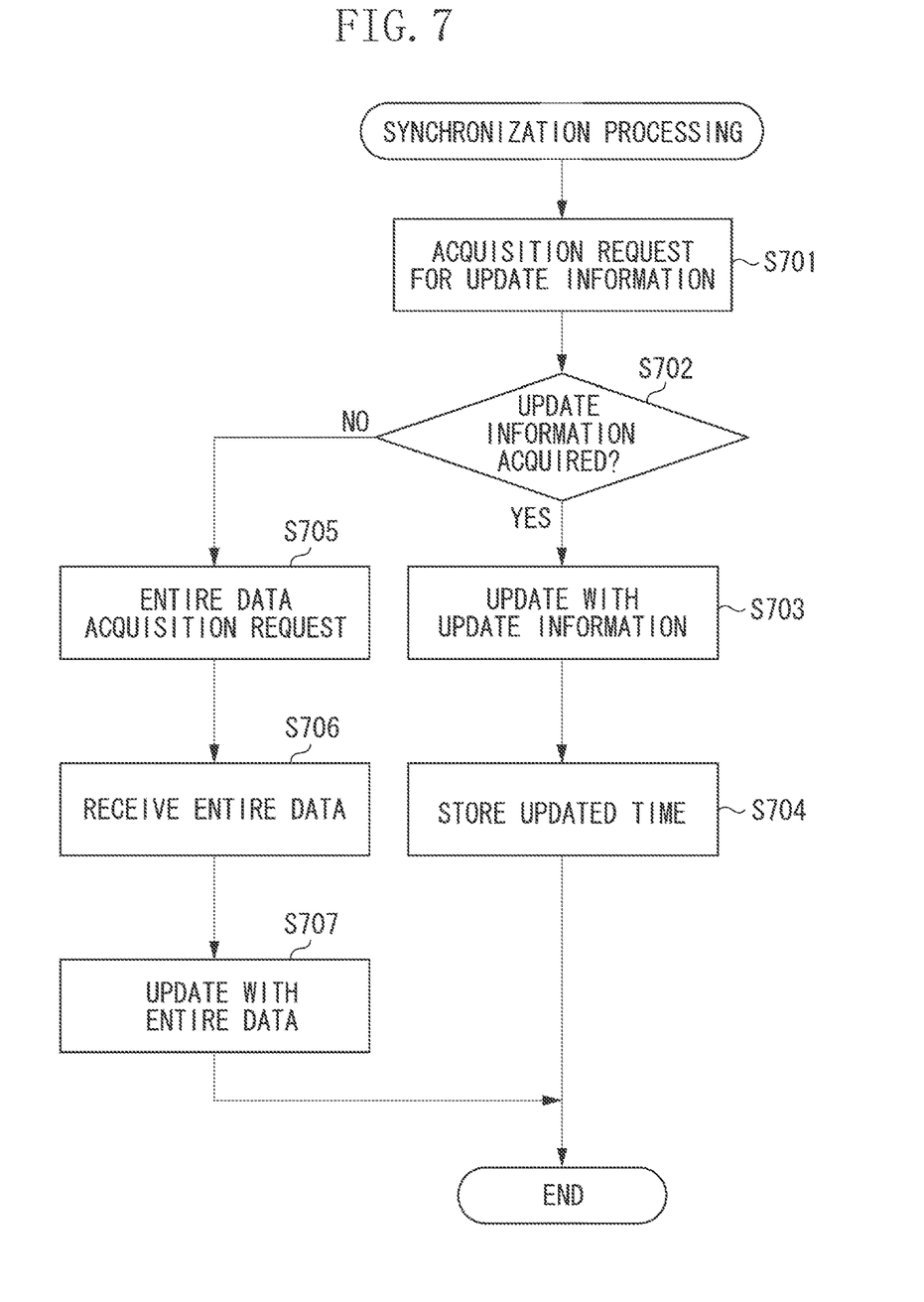
FIG. 7 is a flowchart illustrating synchronization processing executed in the MFP according to a first exemplary embodiment.

Next, synchronization processing executed by the MFP 120 will be described with reference to FIG. 7. More specifically, an example of the synchronization processing executed by the MFP 120b serving as a second client apparatus is described below. A flow illustrated in FIG. 7 is implemented by the control unit 424 of the client application 420. For example, the flow illustrated in FIG. 7 is implemented by the CPU 302 reading out and executing a program stored in the HDD 305 or the ROM 306.

In step S701, the control unit 424 transmits an acquisition request for the update information to the server 110. For example, the acquisition request for the update information may be periodically transmitted. This update information is difference information representing setting information difference between the setting information held in the MFP 120 and the setting information held in the server 110.

The request transmitted by the MFP 120b includes time information indicating a time at which the setting information was updated in the MFP 120b.

The server 110 transmits update information to the MFP 120b as a response. This update information includes a content of the setting information updated in the server 110 after the time indicated by the time information in the acquisition request from the MFP 120b. For example, when the setting information stored in the master data 411 includes setting information whose deletion flag has turned ON after a time indicated by the acquisition request (a time at which the previous synchronization processing was executed), update information indicating that the setting information has been deleted is transmitted as a response. When the master data 411 has not been updated after the previous synchronization processing, the server 110 transmits update information indicating that there has not been any update as a response to the MFP 120b.

In step S702, the control unit 424 determines whether the update information has been successfully acquired. In the present exemplary embodiment, the update information indicating that the master data 411 has not been updated after the previous synchronization processing is also treated as the update information.

When an error response is received from the server 110 (NO in step S702), the processing proceeds to step S705. The update information cannot be acquired when a record indicating that setting information has been deleted from the master data 411 after the previous synchronization processing remains in the deletion recording unit 412 of the server application 410. As described above, the deletion information is recorded in the deletion recording unit 412 at a timing when the setting information (update history) whose deletion flag has been turned ON is deleted from the master data 411. The deletion recording unit 412 does not store information indicating the setting information that has been deleted. Accordingly, the server 110 cannot transmit the content of update (deleted content) as a response to the acquisition request from the MFP 120b. Therefore, the server 110 transmits the error response to the MFP 120b. In such a case, the control unit 424 cannot acquire the update information from the server 110.

When the update information is successfully received (YES in step S702), the processing proceeds to step S703. When the update information is not received from the server 110 successfully (NO in step S702), the processing proceeds to step S705.

In step S703, the control unit 424 updates the setting information recorded in the setting information DB 421 using the update information acquired from the server 110, and then the processing proceeds to step S704.

Table 5 illustrates an example of update information acquired from the server 110. More specifically, Table 5 illustrates one of pieces of setting information included in a list illustrated in Table 3, which has been updated after a time indicated by time information in the update request. The example illustrated in Table 5 indicates that the data of the address 3 has been deleted. In the present exemplary embodiment, the update information transmitted from the server 110 includes information on the address name and the address that have been deleted. The control unit 424 receives the update information illustrated in Table 5 from the server application 410.

TABLE 5

| Difference data | | | |
|---|---|---|---|
| Deleted | Address 3 | Hiroshima | bbbb@xxxx.co.jp |

In step S704, the control unit 424 stores, in the setting information DB 421, time information indicating a time at which the setting information was updated in the MFP 120b. The time information is managed as the latest time of the synchronization between the MFP 120b and the server 110. When the processing in step S704 is completed, the synchronization processing is terminated.

In step S705, the control unit 424 requests the server 110 to transmit the entire setting information about the MFP 120b and a setting item to be updated from among the pieces of setting information recorded in the master data 411. For example, when the address data is requested to be updated, the entire address data, in the master data 411, related to the MFP 120b is requested. For example, acquisition of the entire address data, illustrated in Table 4, stored in the master data 411 is requested. When the address data includes a plurality of pages, only the entire page including the content of update may be requested. Any setting information with a larger data amount than the update information may be requested.

In step S706, the control unit 424 receives the data requested in step S705. In step S707, the control unit 424 reflects the received data on the setting information DB 421. In step S707, the entire address data stored in the setting information DB 421 or the entire page including the update is updated with the address data in the master data 411, instead of replacing only the updated part of the address data. As a result, the data in the setting information DB 421 after the update matches the master data 411. Table 6 illustrates an example of the address data in the setting information DB 421 after the processing in step S707 has been executed. The data in the setting information DB 421 matches the address data in the master data 411 illustrated in FIG. 4.

TABLE 6

| Address No. | Address name | Address |
|---|---|---|
| Address 1 | Okayama | 03-4444-9999 |
| Address 2 | Yamaguchi | aaaa@xxxx.co.jp |
| ... | — | — |
| Address N | — | — |

In the manner described above, the setting information stored in the MFP 120*b* and the setting information stored in the server 110 can be synchronized. For example, when the address 3 is deleted from the master data 411 of the server 110 in response to the deletion request from the MFP 120*a*, the address 3 can be deleted also from the setting information DB 421 of the MFP 120*b*. Synchronization processing executed in the MFP 120*a* is similar to the above described example of the synchronization processing in the MFP 120*b*.

Figure 8:
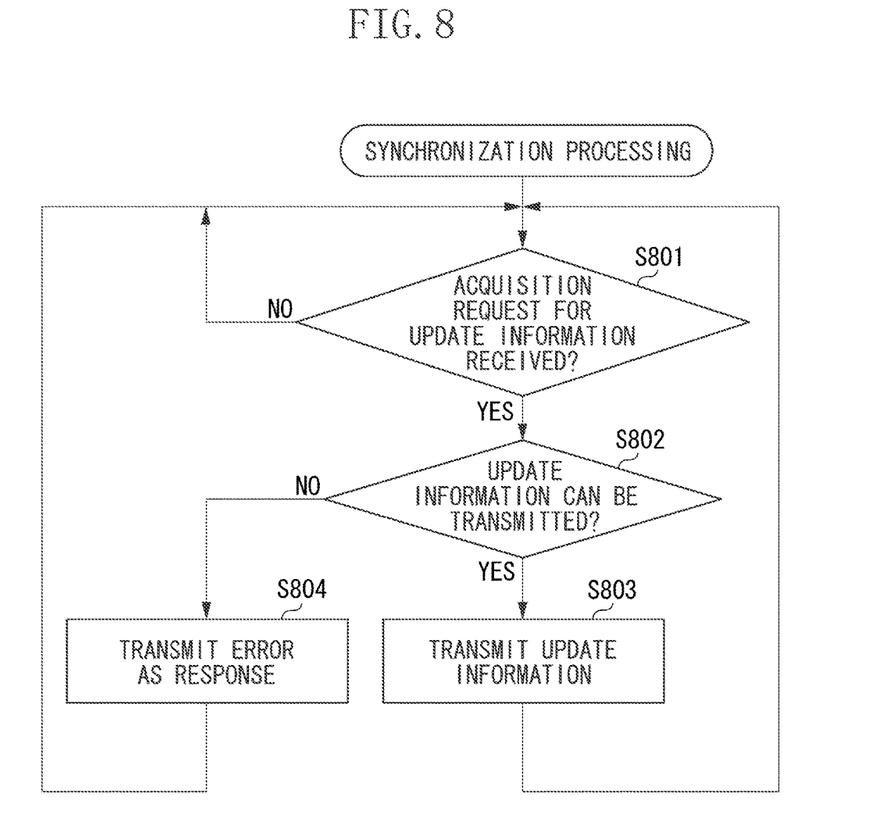
FIG. 8 is a flowchart illustrating synchronization processing executed in the server.

Next, processing executed by the server 110 upon receiving the acquisition request for the update information from the MFP 120 is described with reference to FIG. 8. In an exemplary embodiment described below, the acquisition request for the update information is received from the MFP 120*b*. A flow illustrated in FIG. 8 is implemented by the control unit 415 of the server application 410. The flow illustrated in FIG. 8 is implemented by CPU 203 reading out and executing a program stored in the HDD 205 or the ROM 206.

In step S801, the control unit 415 determines whether an acquisition request for the update information has been received from the MFP 120. When the acquisition request for the update information, transmitted in step S701 illustrated in FIG. 7, has been received (YES in step S801), the processing proceeds to step S802. On the other hand, when the acquisition request for the update information has not been received (NO in step S801), the processing in step S801 is repeated.

In step S802, the control unit 415 determines whether the update information can be transmitted in response to the acquisition request. In the present exemplary embodiment, the control unit 415 determines whether the content of update of the master data 411 after the time indicated by the time information in the acquisition request from the MFP 120*b* can be transmitted. The time information included in the acquisition request is information indicating a time at which the synchronization was previously performed between the MFP 120*b* that has transmitted the acquisition request and the server 110.

For example, the control unit 415 determines that the update information can be transmitted when there is setting information whose deletion flag is turned ON after the time of the previous synchronization. In the present exemplary embodiment, the control unit 415 determines that the content of update (no update) can be transmitted also upon recognizing that the master data 411 has not been updated after the previous synchronization processing.

On the other hand, the control unit 415 determines that the update information cannot be transmitted when the deletion information indicating that the update history (the setting information whose deletion flag has been turned ON) has been deleted from the master data 411 after the time of the previous synchronization, remains in the deletion recording unit 412.

As described above, the deletion information is recorded in the deletion recording unit 412 at the timing at which the setting information (update history) whose deletion flag has been turned ON is deleted from the master data 411. The deletion recording unit 412 records no information indicating setting information that has been deleted. Thus, the server 110 cannot transmit the content of update (the deleted setting information) as a response to the acquisition request from the MFP 120*b*.

When the control unit 415 determines that the update information can be transmitted (YES in step S802), the processing proceeds to step S803. On the other hand, when the control unit 415 determines that the update information cannot be transmitted (NO in step S802), the processing proceeds to step S804.

In step S803, the control unit 415 transmits the update information to the MFP 120 that has transmitted the acquisition request. The update information indicates content of update (including "no update") of the master data 411 after the time indicated by the time information in the acquisition request. In this way, when the master data 411 stores the update information (setting information whose deletion flag has been turned ON) indicating that a part of the setting information is deleted, the update information is transmitted to the MFP 120*b* as a response to the acquisition request.

In step S804, the control unit 415 transmits an error response for the acquisition request. In the present exemplary embodiment, the error response is a notification for prompting the MFP 120*b* to acquire the setting information stored in the master data 411. As described above, when the information indicating that the update information has been deleted from the master data 411 is recorded in the deletion recording unit 412, the control unit 415 performs the control of causing the MFP 120*b* to acquire the setting information stored in the master data 411. When the processing in step S803 or S804 is completed, the processing returns to step S801.

The data to be synchronized is not limited to the address data, as described in the present exemplary embodiment, and may be any types of data with a deletable data structure.

In the present exemplary embodiment described above, even when a notification indicating that setting information has been deleted is received from the first MFP, the server 110 does not immediately delete the setting information in the master data 411, but records the setting information in association with a deletion flag. Then, when a synchronization request is received from a second MFP, a notification indicating that the setting information associated with the deletion flag has been deleted is transmitted. In this way, the synchronization processing can be executed without transmitting the entire address data between the server and the second MFP when the synchronization request is received from the second MFP. Accordingly, the synchronization processing can be executed with a smaller amount of communications between the server and the second MFP. The deletion flag associated with the setting information is deleted when all the MFPs connected to the server 110 have been notified of the setting information. The setting information associated with the deletion flag is deleted when the deletion flag is deleted.

In the present exemplary embodiment described above, the deletion flag is deleted from the server 110 when the predetermined condition is satisfied, for example, when the predetermined time period has elapsed after the deletion flag has been recorded. Then, the address information associated with the deletion flag is deleted from the master data. Thus, the capacity of the storage unit of the server 110 can be prevented from being unnecessarily consumed by the accumulated deletion information.

In step S604 described with reference to FIG. 6, whether the setting information whose deletion flag has been turned ON is to be deleted is determined, and the setting information is determined to be deleted when the predetermined time period has elapsed after the deletion flag has been turned ON. When the MFP 120 transmits the acquisition request for the update information to the server 110 at every predetermined time period T, the control unit 415 may determine that the setting information is to be deleted when at least the predetermined time period T has elapsed after the deletion flag has been turned ON.

In this way, the server 110 receives the acquisition request for the update information from the MFP 120 connected to the server 110 at least once before setting information whose deletion flag has been turned ON is actually deleted from the server 110. The MFP 120 can acquire the setting information whose deletion flag has been turned ON as a response to the acquisition request for the update information transmitted in step S701. Thus, the result of the determination in step S702 is YES, and the setting information DB 421 can be updated with the update information in step S703.

In such an embodiment, the MFP 120 that has been performing synchronization communications with the server 110 before the deletion flag is turned ON can execute the synchronization processing without executing the processing of acquiring the entire data in steps S705 to S707. Therefore, the MFP 120 can execute the synchronization processing using the update information indicating the difference so that a smaller processing load can be achieved compared with the updating involving acquisition of the entire data. Thus, a smaller processing load and communication load in the system can be achieved.

In the processing performed in step S804 described with reference to FIG. 8, the control unit 415 may transmit the entire data of the setting information of the synchronization target stored in the master data 411 to the MFP 120 that has transmitted the acquisition request, instead of transmitting the error response. The entire data is the same as the entire data acquired by the MFP 120 in step S706 as described above.

In this way, the MFP 120 can receive the entire data without transmitting the acquisition request in step S705. Thus, the processing in step S705 can be omitted.

Other Embodiments

A client according to the present invention is not limited to the MFP, and may be a device such as an information device terminal that manages setting information that changes according to the information about the information device terminal.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-170587, filed Aug. 31, 2015, which is hereby incorporated by reference herein in its entirety.

What is claimed is:

1. A server apparatus comprising:
 a storage unit configured to store setting information including a first setting and a second setting;
 a memory device that stores a set of instructions; and
 at least one processor that executes the instructions to:
  receive, from a first client apparatus, a deletion request for the first setting stored in the storage unit;
  store, in the storage unit upon receiving the deletion request, information indicating deletion of the first setting;
  receive, from a second client apparatus, a request for the setting information after the information indicating deletion of the first setting is stored in the storage unit, wherein setting information stored on the second client apparatus includes the first setting and the second setting;
  upon receiving the request for the setting information, determine whether to send the second setting or the information indicating deletion of the first setting without sending the second setting, the determination based on a latest synchronization time at which synchronization of setting information was performed between the second client apparatus and the server apparatus; and
  in a case it is determined to send the second setting, send the second setting to the second client apparatus, and, in a case it is determined to send the information indicating deletion of the first setting without sending the second setting, send the information indicating deletion of the first setting to the second client apparatus without sending the second setting.

2. The server apparatus according to claim 1, wherein the at least one processor further executes the instructions to:
 perform control in such a manner that the information indicating deletion of the first setting remains stored in the storage unit until a predetermined time period elapses after the deletion request is received, and that the information indicating deletion of the first setting is deleted from the storage unit in a case where the predetermined time period has elapsed after the deletion request is received.

3. The server apparatus according to claim 1, wherein the at least one processor further executes the instructions to:
 perform control in such a manner that the information indicating deletion of the first setting remains stored in the storage unit until an amount of the setting information stored in the storage unit exceeds a predetermined threshold after the deletion request is received, and is deleted from the storage unit in a case where the amount of the setting information stored in the storage unit exceeds the predetermined threshold.

4. The server apparatus according to claim 1, wherein the second client apparatus is an image forming apparatus.

5. The server apparatus according to claim 1, wherein the server apparatus is an image forming apparatus having a function of forming an image on a recording medium.

6. The server apparatus according to claim 1,
wherein the setting information comprises updated setting information obtained by updating previously stored setting information, and
wherein the at least one processor further executes the instructions to:
compare the latest synchronization time with an update time at which the previously stored setting information was updated; and
based on determining by the comparison that the latest synchronization time is earlier than the update time, send the second setting to the second client apparatus.

7. The server apparatus according to claim 1,
wherein the setting information comprises updated setting information obtained by updating previously stored setting information, and
wherein the at least one processor further executes the instructions to:
compare the latest synchronization time with an update time at which the previously stored setting information was updated; and
based on determining by the comparison that the latest synchronization time is later than the update time, send the information indicating deletion of the first setting to the second client apparatus without sending the second setting.

8. A server apparatus comprising:
a storage unit configured to store setting information used by a client apparatus to operate;
a memory device that stores a set of instructions; and
at least one processor that executes the instructions to:
receive, from a first client apparatus, a deletion request for deleting a part of the setting information stored in the storage unit;
notify a second client apparatus of update information indicating that the part of the setting information to which the deletion request has been transmitted is deleted;
perform control in such a manner that the update information remains stored in the storage unit until the server apparatus notifies at least both of the first client apparatus and the second client apparatus of the update information after the deletion request is received, and is deleted from the storage unit in a case where the server apparatus notifies at least both of the first client and the second client of the update information; and
perform control in such a manner that the update information and the part of the setting information remain to be stored in the storage unit until the server apparatus notifies at least both of the first client apparatus and the second client apparatus of the update information after the deletion request is received, and are deleted from the storage unit in a case where the server apparatus notifies at least both of the first client apparatus and the second client apparatus of the update information.

9. A control method for a server apparatus, comprising:
storing, in a storage unit, setting information including a first setting and a second setting;
receiving, from a first client apparatus, a deletion request for the first setting stored in the storage unit;
storing, in the storage unit upon receiving the deletion request, information indicating deletion of the first setting;
receiving, from a second client apparatus, a request for the setting information after the information indicating deletion of the first setting is stored in the storage unit, wherein setting information stored on the second client apparatus includes the first setting and the second setting;
upon receiving the request for the setting information, determining whether to send the second setting or the information indicating deletion of the first setting without sending the second setting, the determination based on a latest synchronization time at which synchronization of setting information was performed between the second client apparatus and the server apparatus; and
in a case it is determined to send the second setting, sending the second setting to the second client apparatus, and, in a case it is determined to send the information indicating deletion of the first setting without sending the second setting, sending the information indicating deletion of the first setting to the second client apparatus without sending the second setting.

10. A non-transitory computer readable storage medium storing a program for causing a computer to execute a method, the method comprising:
storing, in a storage unit, setting information including a first setting and a second setting;
receiving, from a first client apparatus, a deletion request for the first setting stored in the storage unit;
storing, in the storage unit upon receiving the deletion request, information indicating deletion of the first setting;
receiving, from a second client apparatus, a request for the setting information after the information indicating deletion of the first setting is stored in the storage unit, wherein setting information stored on the second client apparatus includes the first setting and the second setting;
upon receiving the request for the setting information, determining whether to send the second setting or the information indicating deletion of the first setting without sending the second setting, the determination based on a latest synchronization time at which synchronization of setting information was performed between the second client apparatus and the computer; and
in a case it is determined to send the second setting, sending the second setting to the second client apparatus, and, in a case it is determined to send the information indicating deletion of the first setting without sending the second setting, sending the information indicating deletion of the first setting to the second client apparatus without sending the second setting.

* * * * *